US006847802B2

(12) United States Patent
Migliaccio

(10) Patent No.: US 6,847,802 B2
(45) Date of Patent: Jan. 25, 2005

(54) TRANSMITTER-RECEIVER APPARATUS WITH SIGNAL CODING UNIT ACCORDING TO RDS STANDARD

(75) Inventor: Riccardo Migliaccio, Rome (IT)

(73) Assignee: Astro Investments Limited, Hong Kong (CN)

( * ) Notice: Subject to any disclaimer, the term of this patent is extended or adjusted under 35 U.S.C. 154(b) by 555 days.

(21) Appl. No.: 09/771,941

(22) Filed: Jan. 29, 2001

(65) Prior Publication Data

US 2001/0043645 A1 Nov. 22, 2001

(30) Foreign Application Priority Data

Feb. 14, 2000 (IT) .................................... RM2000A0069

(51) Int. Cl.[7] ............................ H04H 1/00; H04H 7/00; H04B 1/18

(52) U.S. Cl. ..................... 455/45; 455/186.1; 455/3.05; 455/3.06

(58) Field of Search .............................. 455/3.05, 3.06, 455/45, 186.1; 370/349, 325

(56) References Cited

U.S. PATENT DOCUMENTS 6,018,313 A * 1/2000 Engelmayer et al. .. 342/357.02
6,088,577 A * 7/2000 Yang et al. ................ 340/7.57
6,493,546 B2 * 12/2002 Patsiokas ................. 455/277.1
6,539,212 B1 * 3/2003 Kamalski ................. 455/186.1
6,563,805 B1 * 5/2003 Ma et al. ..................... 370/325
6,611,749 B1 * 8/2003 Berwanger et al. ...... 455/186.1
6,625,464 B1 * 9/2003 Bandy et al. ............... 455/503

FOREIGN PATENT DOCUMENTS

IT RM97A000712 11/1997

OTHER PUBLICATIONS

English–language translation of Italian Application No. RM97A000712 entitled "<<Apparatus and Method for the Reception of Radio Signals Transmitted by RDS System>>".

* cited by examiner

*Primary Examiner*—Lee Nguyen
*Assistant Examiner*—Yuwen Pan
(74) *Attorney, Agent, or Firm*—Ladas & Parry LLP

(57) ABSTRACT

A signal-coding unit, to be used with a radio receiver compatible with the RDS standard, receiving as input an input signal according to RDS standard comprising not indicative information about the radio receiver, and emitting as output an output signal, comprising signal-combining means for combining at least one portion of the input signal with a signal component comprising indicative information about the radio receiver, the combination between the above mentioned portion of the input signal and the signal component being the output signal (FIG. 2).

13 Claims, 6 Drawing Sheets

TRANSMITTER-RECEIVER APPARATUS WITH SIGNAL CODING UNIT ACCORDING TO RDS STANDARD

DESCRIPTION

The present invention refers to a transmitter-receiver apparatus with a signal-coding unit according to the RDS standard as well as to a radio-transmitted data receiving system with a signal-decoding unit.

It is known that the RDS signal, transmitted by a source transmission station together with the usual radio signal, is constituted by a plurality of components apt to provide information of general kind, such as for example information about traffic, important news, information about the transmission station, information about the transmitted program, information about broadcasting musical pieces and so on.

As far as the reception side is concerned, radio receivers are known in this connection providing the presence of two distinct decoding units, the first one apt to decode traditional broadcast signals and the second one apt to decode RDS data, the latter subsequently sent to a display in order to be appreciated by a user upon listening the transmitted piece.

It is to be meant that such RDS signal is subject to decoding operations only, since it has not to be utilized for subsequent operations which in some way bear traces of the specific receiver.

From the patent application RM97A000712 in the name of the same applicant, also radio receivers are known equipped with a function for automatically searching for pieces. However, not even in this case information is added to the received RDS signal.

Moreover none of the known receivers is equipped with data transmission devices to be utilized for establishing a communication channel between radio receivers and a data receiving and processing system aimed at providing services of various kind and based upon RDS data received by the above mentioned receivers equipped with transmission devices both to the source transmission stations and to the single radio-listeners.

The present invention solves the above mentioned prior art drawbacks, since it provides a signal-coding unit, to be used with a radio receiver compatible with the RDS standard, receiving as input an input signal according to RDS standard comprising not indicative information about said radio receiver, and emitting as output an output signal, characterized in that it comprises signal-combining means for combining at least one portion of said input signal with a signal component comprising indicative information about said radio receiver, the combination between said at least one portion of said input signal and said signal component being said output signal.

It is furthermore provided a transmitter-receiver apparatus comprising:

- a radio receiver compatible with the RDS standard, apt to receive a signal according to the RDS standard;
- a signal-coding unit, connected to said radio receiver; and
- a transmission unit, connected to said signal-coding unit, apt to transmit the output signal emitted as output by said signal-coding unit.

A signal-decoding unit, to be used in a system for receiving radio-transmitted data, receiving as input an input signal comprising indicative information about a transmitter-receiver apparatus therefrom said input signal is transmitted, characterized in that it comprises signal-separating means for separating from said input signal said indicative information about said transmitter-receiver apparatus, and a system for receiving radio-transmitted data are furthermore provided, comprising:

- a receiving unit apt to receive a signal coming from at least one of said radio receivers;
- a signal-decoding unit, connected to said receiving unit;
- a control unit, connected to said signal-decoding unit, apt to control capturing, storing, processing and monitoring of signals coming from said signal-decoding unit;
- a storing unit, connected to said control unit, apt to store data coming from said control unit; and
- a processing unit, connected to said control unit, apt to perform statistical-type calculations on data sent by said control unit.

In the herebelow description some embodiments of the present invention will be referred to, illustrated by way of example and not for limitative purposes. In particular the figures of the enclosed drawings will be referred to, wherein.

Figure 1:
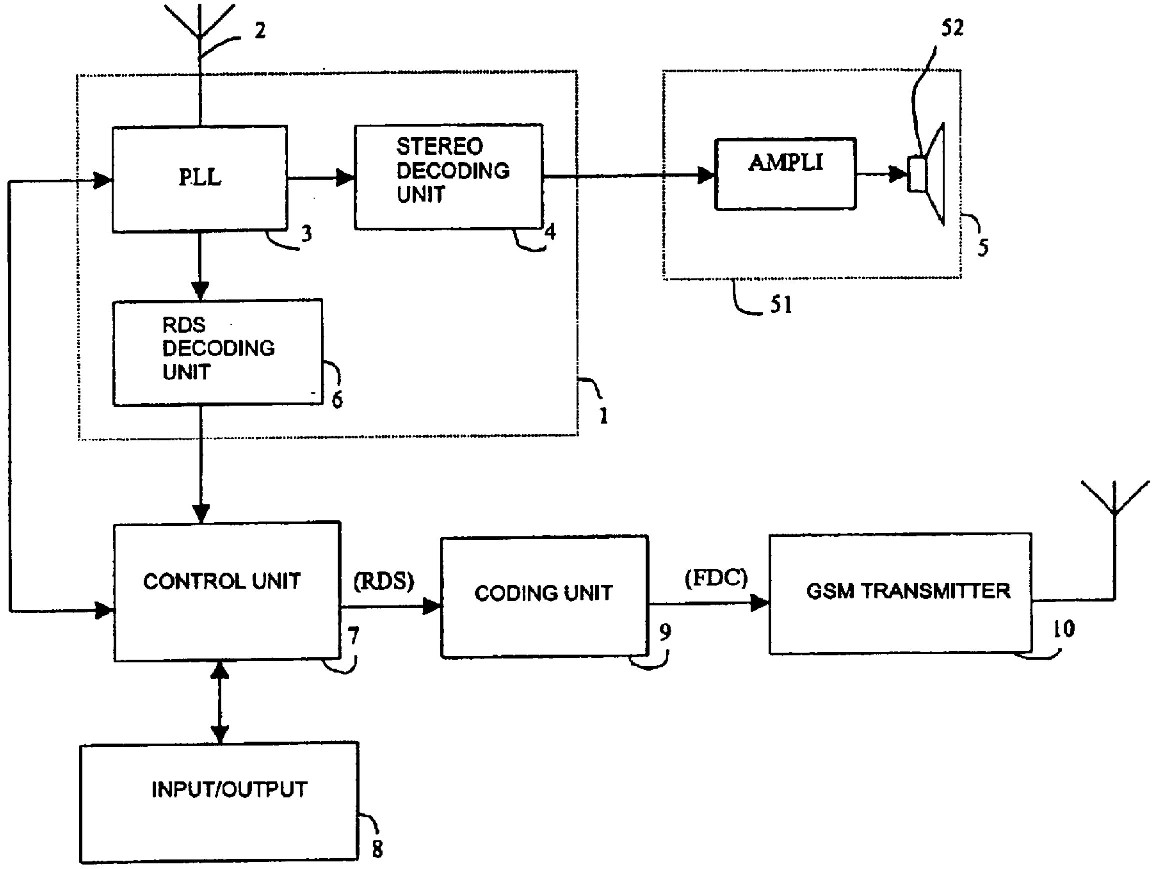
FIG. 1 shows a block diagram of a transmitter-receiver apparatus and of a coding unit according to a first embodiment of the present invention.

First of all FIG. 1 is referred to showing the block diagram of a transmitter-receiver apparatus according to a first embodiment. In particular a tuner is visible, designated with the numeral 1 as a whole, comprising:

- an antenna 2;
- a PLL unit 3 to search for and lock a desired frequency;
- a RDS data decoding unit 6, placed downstream of the PLL unit 3; and
- a stereo decoding unit 4, placed downstream of the PLL unit 3. The functions of the apparatuses 2, 3, 4 and 6 are known to the person skilled in the art and they will not be described here in detail.

The signal outputting from the stereo decoding unit 4 is sent to an audio amplifying and reproducing system designated with the numeral 5 as a whole. This system comprises in particular an amplifier 51 and a loudspeaker 52.

Moreover, there is a control unit 7 which provides for controlling the whole device. To the control unit 7 input/output devices 8 are connected such as a keyboard and an alphanumerical display, and the tuner 1, connected to the central unit 7 by the PLL unit 3 and the RDS decoder 6.

To the control unit 7, according to the present invention, a signal coding unit 9 is furthermore connected. Such unit receives as input a signal according to the RDS standard and provides for processing the same so as to extract therefrom some components corresponding to an input signal portion. To these components the coding unit 9 provides for adding some others containing information apt to identify univocally the transmitter-receiver apparatus of the Figure, so as to generate an output signal, hereinafter designated as FDC (FeedBack Data Channel) signal.

The structure of this signal will be described in detail in the following FIG. 3.

The FDC signal is then fed to a transmission device 10, constituted for example by a transmitter compatible with the GSM standard, the purpose thereof is to transmit the FDC signal toward a data receiving, gathering, processing and sorting system. Such system will be schematically represented in the following FIG. 4.

Figure 2:
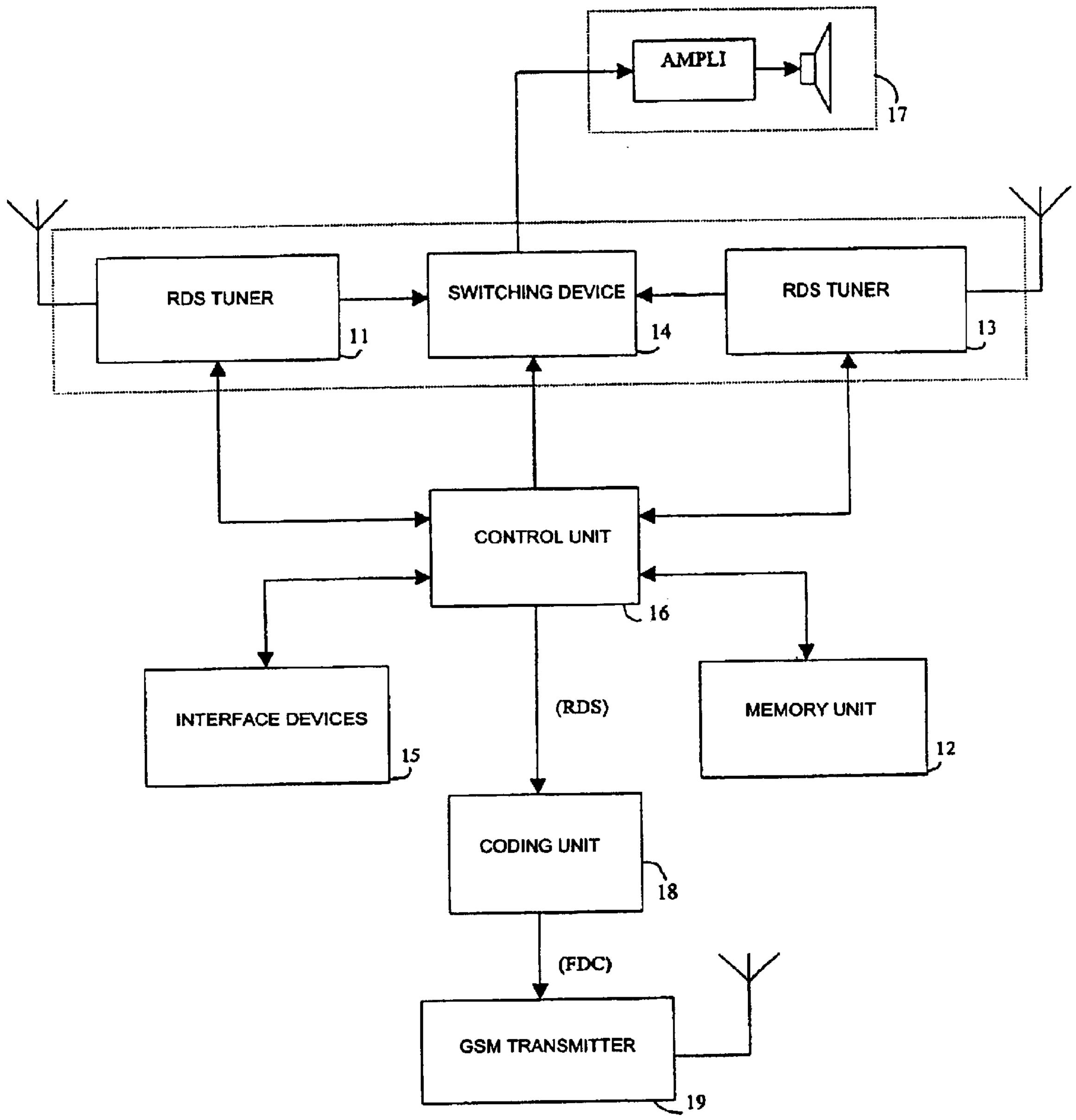
FIG. 2 shows a block diagram of a transmitter-receiver apparatus and of a coding unit according to a second embodiment of the present invention.

The FIG. 2 shows the block diagram of a radio receiver according to a second embodiment of the present invention wherein a radio receiver is provided equipped with the piece-searching function described in the already mentioned patent RM97A000712, the description thereof is incorporated for reference in the present application.

The system of FIG. 2 allows, upon listening a radio station, to search for other broadcasting stations transmitting on other frequencies and containing, in the corresponding RDS signal, information similar to those present in the RDS signal of the broadcasting stations which is being listened.

In FIG. 2 it is noted the presence of:

- a first tuner 11 to select and receive the first frequency;
- a memory unit 12 to store RDS data;
- a second tuner 13 to select, during reception of said first frequency, a second frequency different from the first one and not belonging to the list of the frequencies alternative to the first frequency;
- a switching device 14 apt to switch the connection of the first and second tuner with the audio amplifying system 17, after comparing the RDS data related to the second frequency with the RDS data stored in the memory unit;
- interface devices 15 such as for example a liquid crystal display and an alphanumerical keyboard; and
- a control unit 16 apt to coordinate the interactions existing between the component parts of the system.

According to the present invention, a signal coding unit 18 is furthermore connected to the control unit 16, receiving as input a signal according to the RDS standard, coming from the control unit itself.

Such coding unit 18, as in the previously described case, comprises signal combination means and provides for combining a RDS signal portion coming from the broadcasting station with the other signal components characteristic of the radio apparatus whereon it is provided.

The so obtained FDC signal is then fed to a transmission device 19, constituted for example by a GSM transmitter, apt to transmit the FDC signal to a data receiving, gathering, processing and sorting system according to what will be schematically represented in the following FIG. 4.

Naturally it will be possible to provide, in alternative embodiments, the use of transmission technologies different from the one corresponding to the GSM standard.

Figure 3:
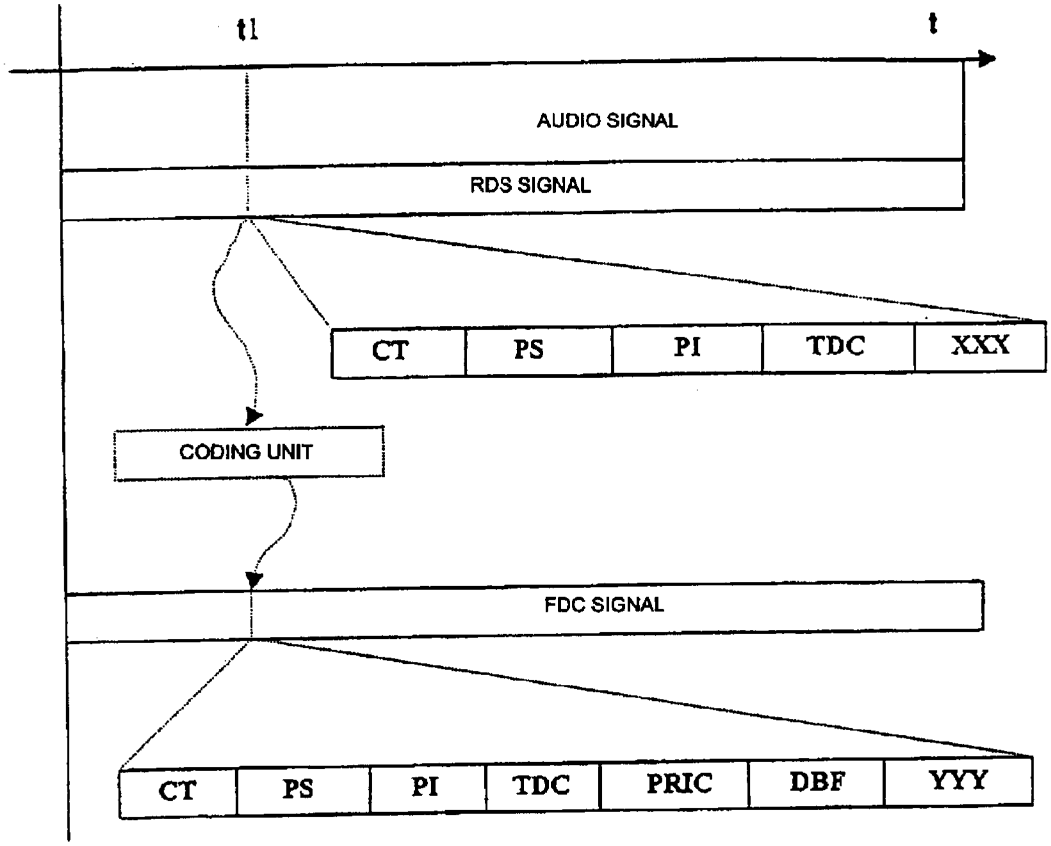
FIG. 3 shows a timing chart illustrating the composition of the RDS signal and of the FDC signal.

The FIG. 3 shows a timing chart versus time, apt to allow understanding in greater detail the FDC signal composition starting from the RDS signal. In particular, on the top side of the figure an exemplary composition of the RDS signal associated to the radio signal in a time t1 is visible as an exploded view.

In particular, the highlighted components are:

- a signal component (CT), comprising indicative information about current date and time;
- a signal component (PS), comprising indicative information of the currently tuned broadcasting station;
- a signal component (PI), comprising indicative information about the program transmitted by the currently tuned broadcasting station;
- a signal component (TDC), comprising auxiliary data; and
- a signal component (XXX) representing in general all the RDS signal components which have not been taken into consideration.

On the bottom side of the figure an exploded view can be noted showing the composition of the FDC signal as generated by the previously described coding units.

As it can be seen in the figure, this FDC signal comprises, apart from some of the described components, characteristic of the RDS signal, other components characteristic of the apparatus which has transmitted the FDC signal. In particular the following is visible:

- a signal component (PRIC) comprising indicative information about the receiver;
- a signal component (DBF) comprising indicative information about a list of pieces preferred by the receiver user; and
- a signal component (YYY) comprising possible auxiliary information which will not be described in detail here.

At least one of the components added to the RDS signal, and in particular the PRIC component, will have to contain information so as to allow associating in a univocally way the received FDC signal, to the transmitter-receiver apparatus which has transmitted it, for example by means of the serial number of the transmitter-receiver apparatus.

The DBF signal component, related to the list of preferred pieces, is to be provided in case the FDC signal represented in the figure comes from a transmitter-receiver apparatus implemented according to the described second embodiment, that is equipped with a piece-searching system. The presence of this DBF component allows the system to receive and process data, to get to know about the musical preferences of the radio-listeners and to advantageously exploit this knowledge for example to make classifications or allow radio stations to improve their own musical programming.

Naturally adding further signal components may be easily provided, if the output signal, still designated as FDC signal, has to contain additional information not present in the above mentioned components and necessary to implement a particular function or a particular service.

Figure 4:
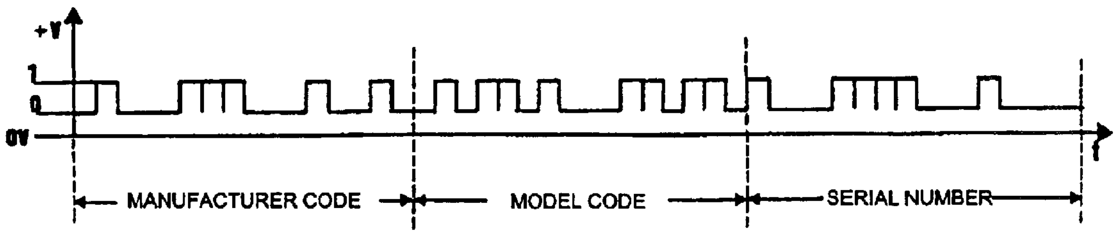
FIG. 4 shows an exemplary timing chart of the PRIC signal component.

The following FIG. 4 shows an exemplary timing chart of a PRIC signal component containing indicative information about the transmitter-receiver apparatus. In particular, such component can comprise three data blocks, each of them, in turn, is constituted by sixteen bit. In the first block a code identifying the manufacturer can be coded, in the second block a code identifying the model, and in the third block a serial number. Such code could advantageously be stored in a ROM-type read-only memory, present in the transmitter-receiver apparatus and read upon coding the FDC signal, as it will be hereinafter described.

Figure 5:
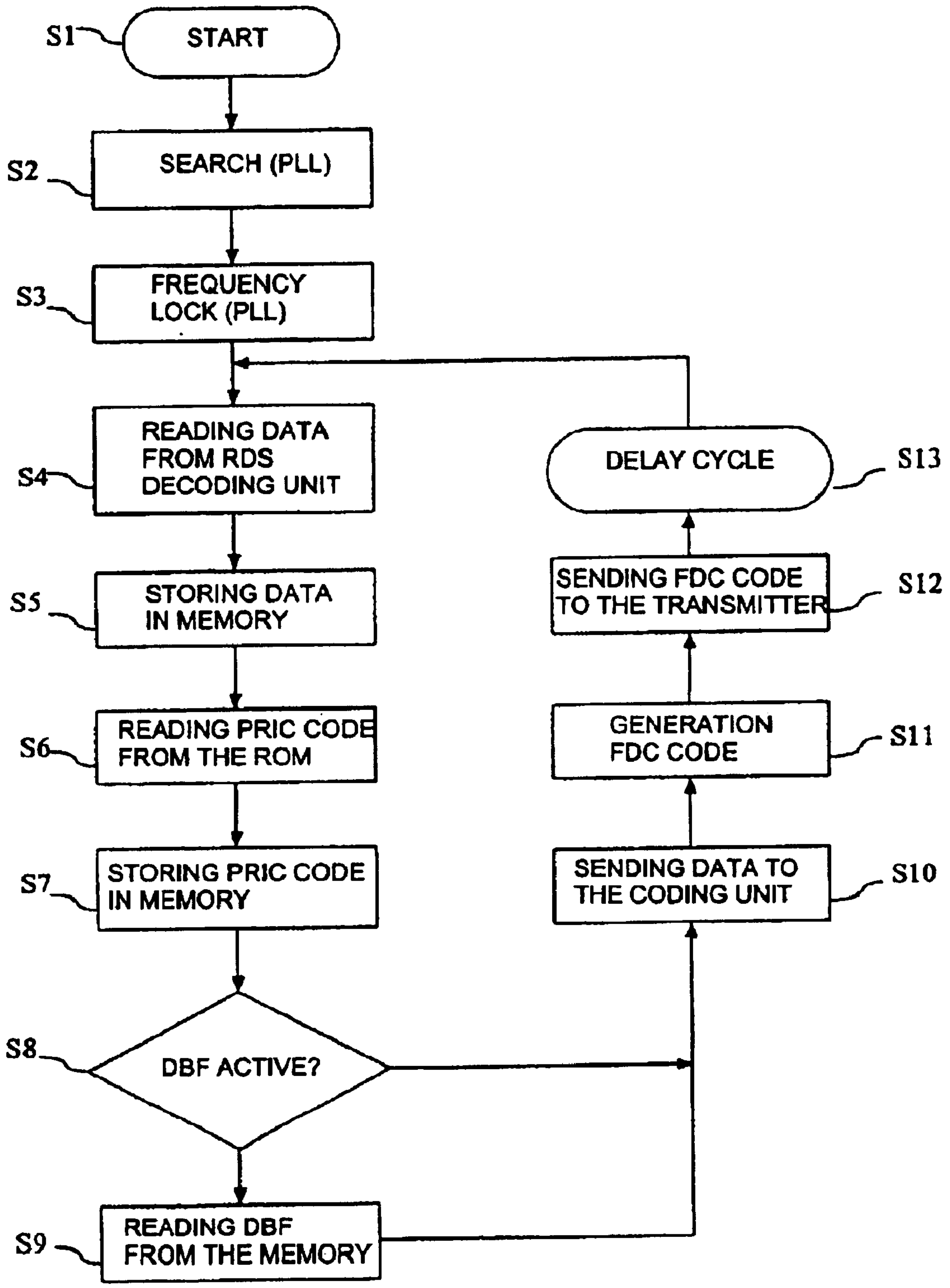
FIG. 5 shows a flow chart representing a coding cycle of the FDC signal.

The following FIG. 5 shows a flow chart describing in a schematic way the operation of extracting data from the RDS signal, the combination thereof with additional signal components and the subsequent sending of the so-composed signal to the transmission unit. In particular, starting from the initial step S1, the searching step S2 performed by a PLL unit is highlighted. Thereafter, in a step S3 the desired frequency is locked. The control is then passed to the step S4 which receives the data coming from a RDS data decoding unit and provides for extracting the involved components, in particular the previously described components CT, PS, PI and TDC. Such components are then stored in a RAM-type memory (step S5).

In the step S6, it is then provided for reading from a ROM-type memory the PRIC signal component identifying the particular transmitter-receiver apparatus.

In the step S7, instead, it is provided for storing in the RAM memory also the PRIC component.

In a control step S8 it is checked whether the DBF function has been activated. If this results true, the following step S9 reads from the memory also the data related to the DBF signal component.

All the hereto read signal components are then sent to a FDC data coding unit (step S10) which provides for generating the whole FDC signal (step S11).

The so-generated signal is radio-sent to the transmission unit (step S12) to be indeed transmitted to a data gathering and processing system.

In a step S13 a delay cycle is then inserted to synchronize the following coding operation of the FDC signal. At the end of the delay cycle, the procedure starts again as from step S4.

Figure 6:
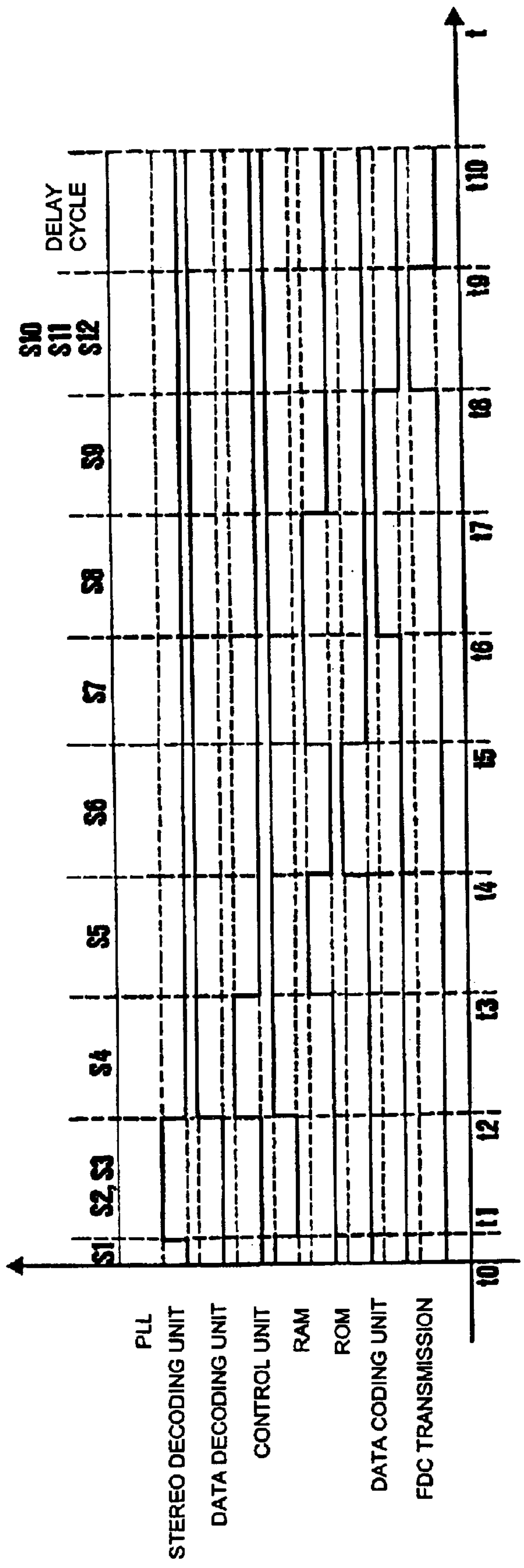
FIG. 6 shows a timing chart representing the activity intervals of the system components.

The following FIG. 6 shows a timing chart related to the above mentioned sequence of operations. In particular, the activity intervals of the units involved in the sequence described in the preceding FIG. 4 (from S1 to S13) and namely the PLL unit, the stereo decoding unit, the data decoding unit, the control unit, the RAM memory, the ROM memory, the data coding unit and the transmitter of the FDC signal are highlighted.

Starting from the time t1, the PLL unit is activated to lock the requested frequency. In the time interval t1–t2, the search for this frequency is performed, which is locked in the time t2. At this time t2 the control unit is activated, which moreover will remain active until the end of the described cycle.

Still at the time t2 are furthermore activated the stereo decoding unit to audio-reproduce the radio signal and the data decoding unit to decode data coming from the associated RDS signal. Also the stereo decoding unit will remain active until the end of the cycle.

At the time t3, the data decoding unit is deactivated and the RAM memory is enabled in order to allow writing the decoded data. This writing operation takes place during the interval t3–t4. During the following time interval t4–t5, the ROM memory is activated in order to allow reading the PRIC code containing information identifying the transmitter-receiver apparatus. Such PRIC code is stored in the RAM memory during the following time interval t5–t6.

At the time t6 a check is performed to verify if the DBF function is active or not. Should this function be active, the data related to the DBF signal component DBF are read by the RAM memory during the time interval t6–t7. At the time t6 the data coding unit is furthermore activated, which will remain active until the time t8. At this time t8 the radio transmitter is activated which provides for transmitting the FDC signal, during the time interval t8–t9.

The following interval t9–t10 represents the delay cycle inserted to synchronize the following coding operation of the FDC signal.

Figure 7:
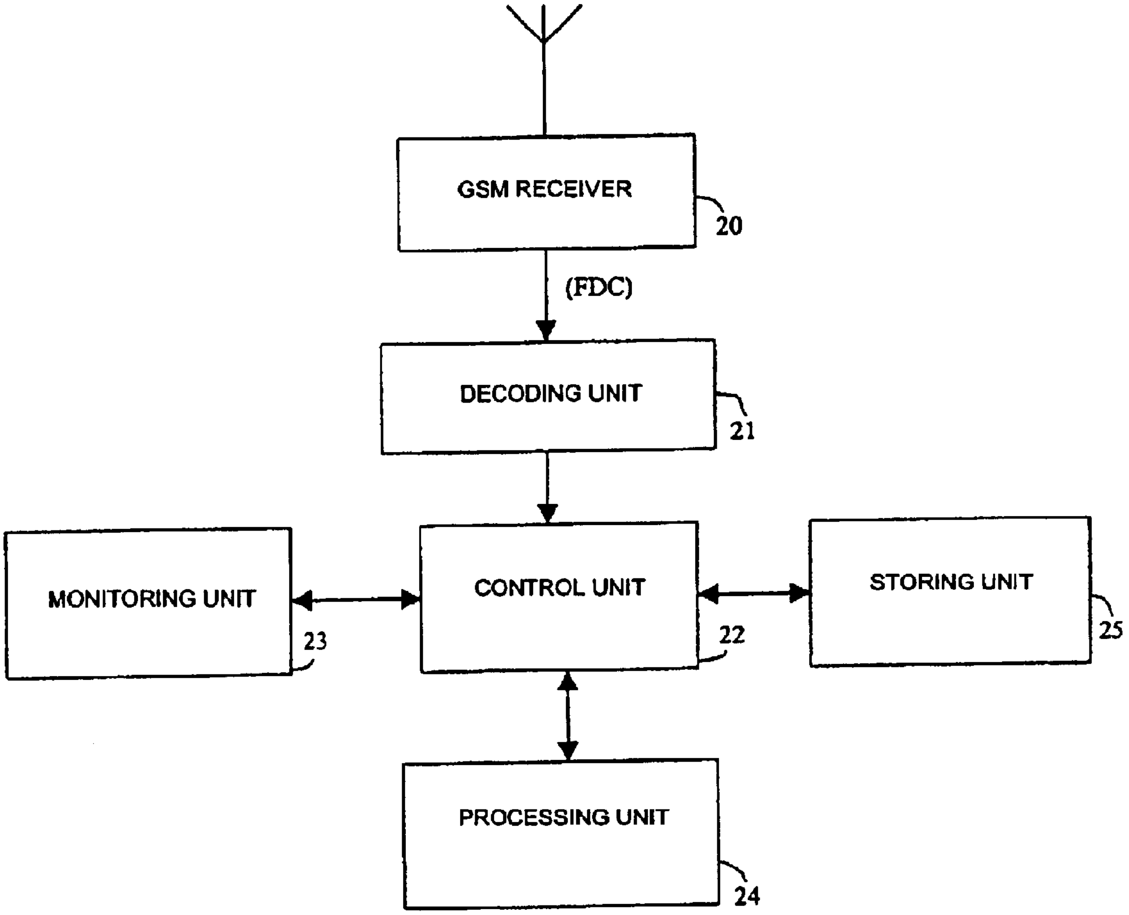
FIG. 7 shows a block diagram of the data receiving system and of a decoding unit according to the present invention.

The following FIG. 7 shows the block diagram of the receiving, processing, storing and sorting system of the data coming from each of the radio receivers of the so far described type. The system represented in the figure is constituted by:

- a data receiving device 20 compatible with the transmission standard utilized by the already described apparatuses; in the particular case a receiving system compatible with the GSM standard is shown;
- a decoding unit 21, receiving as input a FDC signal of the type described with reference to the preceding FIG. 3. This decoding unit extracts from the FDC signal the components contained therein, among which the already described components containing indicative information about the transmitter-receiver apparatus which has generated this FDC signal, in this way by making them available in the subsequent processings;
- a control unit 22, aimed at receiving the data coming from the decoding unit 21 and at handling the interactions between all the parts composing the system;
- a storing unit of the received data 25;
- a data processing unit 24 so as to process the received data and perform a series of procedures of statistical analysis on the data at issue; and
- a monitoring unit 23, constituted for example by devices such as: monitor, printer and keyboard, which enables both the continuous display of the results of the processings performed by the processing unit 24, and the interaction of an operator with the control unit, in order to make the system to do particular operations or to extract the desired data from the memory unit 25.

A second embodiment of this data receiving, processing, storing and sorting system could provide that the reception of the data transmitted by each of the radio receivers takes places according to different modes compared to what has been now described. These radio-transmitted data could, for example, be received through a network such as Internet, according to modes similar to what has been provided by some broadcasting stations. These techniques for transmitting data via Internet will not be described in detail since they are already known by the person skilled in the art.

The data coming from the transmitter-receiver apparatuses are then processed, stored and utilized in order to provide a plurality of services both to the broadcasting stations and to the single radio-listener. In particular such systems allows:

- to know in every moment which broadcasting station and which programme each radio-listener is listening to;
- to calculate listening index on line or based on data extracted from a stored historical file;
- to process statistics of various type also on data eventually provided by radio-listeners; and
- to communicate with a particular radio-listener through a text transmitted together with the RDS signal, and to obtain an answer from the radio-listener by means of the FDC signal.

The hereto described service examples are only some services which can be implemented by means of the present invention. Other and different services could be easily provided and implemented by exploiting the possibility of a two-directional communication between the broadcasting stations, a data-receiving station and a plurality of radio-listeners.

The present invention has been so far described according to embodiments thereof illustrated by way of example and not for limitative purposes.

It is to be meant that other embodiments may be provided, all comprised within the protective scope of the same.

What is claimed is:

1. A transmitter-receiver apparatus comprising:

- a radio receiver compatible with the RDS standard and receiving a signal according to the RDS standard;
- a signal-coding unit connected to said radio receiver, receiving as input an input signal according to the RDS standard comprising not-indicative information about said radio receiver, and emitting as output an output signal, said signal-coding unit combining at least one portion of said input signal with a signal component comprising indicative information about said radio receiver, the combination between at least one portion of said input signal and said signal component being said output signal; and a transmission unit connected to said signal coding unit, adapted to transmit the output signal emitted as output by said signal coding unit.

2. The transmitter-receiver apparatus according to claim 1, wherein said output signal comprises:

a first output signal component, adapted to represent current data and current time;

a second output signal component, comprising indicative information about said radio receiver;

a third output signal component, comprising indicative information about a source transmission station of said input signal; and a fourth output signal component, comprising indicative information about a piece transmitted by said source transmission station and received by said radio receiver.

3. The transmitter-receiver apparatus according to claim 2, wherein said second output signal component comprises one or more data blocks, each of said blocks being constituted by a bit sequence adapted to represent a portion of said indicative information about said radio receiver.

4. The transmitter-receiver apparatus according to claim 1, wherein said output signal comprises a fifth output signal component, comprising indicative information about a list of preferred pieces.

5. The transmitter-receiver apparatus according to claim 1, wherein said radio receiver includes a piece-searching system, which comprises:

a first tuner to select and receive a first frequency;

a memory unit to store RDS data;

a second tuner to select, while receiving said first frequency, a second frequency different from the first frequency and not belonging to the AF list of the frequencies alternative to the first frequency; and a switching device adapted to control the reception switching between the first and second tuner after comparing RDS data related to said second frequency with the RDS data stored in the memory unit.

6. The transmitter-receiver apparatus according to claim 1, wherein said transmission unit adopts a GSM-type data transmission standard.

7. A system for receiving radio-transmitted data comprising:

a receiving unit adapted to receive a signal coming from at least one transmitter-receiver apparatus;

a signal-decoding unit connected to said receiving unit, receiving as input a first input signal comprising indicative information about a transmitter-receiver apparatus from which said input signal is transmitted, said signal-decoding unit separating said indicative information about said transmitter-receiver apparatus from said first input signal;

a control unit connected to said signal-decoding unit, adapted to control capturing, storing, processing and monitoring of signals coming from said signal-decoding unit;

a storing unit connected to said control unit, adapted to store data coming from said control unit; and a processing unit connected to said control unit, adapted to perform statistical-type calculations on data sent by said control unit, wherein said at least one transmitter-receiver apparatus comprises:

a radio receiver compatible with the RDS standard and receiving a signal according to the RDS standard;

a signal-coding unit connected to said radio receiver, receiving as input a second input signal, the second input signal being a signal according to the RDS standard and comprising not-indicative information about said radio receiver, said signal-coding unit emitting as output an output signal, said signal-coding unit combining at least one portion of said second input signal with a signal component comprising indicative information about said radio receiver, the combination between at least one portion of said second input signal and said signal component being said output signal; and a transmission unit connected to said signal-coding unit, to transmit said output signal.

8. The system according to claim 7, wherein said first input signal comprises:

a first input signal first component, comprising indicative information about transmission date and time of said first input signal;

a first input signal second component, comprising said indicative information about said radio transmitter from which said first input signal is transmitted;

a first input signal third component, comprising indicative information about a source transmission station of said first input signal; and a first input signal fourth component, comprising indicative information about an excerpt transmitted by said source transmission station.

9. The system according to claim 7, wherein said first input signal second component comprises one or more data blocks, each of said one or more data blocks being formed by a bit sequence adapted to represent a portion of said indicative information about said radio transmitter from which said first input signal is transmitted.

10. The system according to claim 7, wherein said first input signal comprises a first input signal fifth component, comprising indicative information about a list of preferred pieces.

11. The system according to claim 7, wherein said receiving unit adopts a data-receiving GSM-type standard.

12. The system according to claim 7, wherein said statistical-type calculations on data provided by said control unit are performed in real time by said processing unit.

13. The system according to claim 7, wherein said statistical-type calculations on data provided by said control unit are performed in historical mode by said processing unit.

* * * * *